(12) United States Patent
Tinklepaugh

(10) Patent No.: US 6,260,932 B1
(45) Date of Patent: Jul. 17, 2001

(54) HANDLE EXTENSION OF A VALVE

(75) Inventor: Mark Tinklepaugh, Central Park, NY (US)

(73) Assignee: Ne York Air Brake Corporation, Watertown, NY (US)

(*) Notice: Subject to any disclaimer, the term of this patent is extended or adjusted under 35 U.S.C. 154(b) by 0 days.

(21) Appl. No.: 09/379,467

(22) Filed: Aug. 24, 1999

(51) Int. Cl.[7] .................................................. B60T 7/16
(52) U.S. Cl. ............................. 303/18; 303/50; 251/293
(58) Field of Search ........................... 251/293; 303/50, 303/18

(56) References Cited

U.S. PATENT DOCUMENTS

| | | |
|---|---|---|
| 201,996 | 4/1878 | Connolly . |
| 300,501 | 6/1884 | Payne . |
| 755,918 | 3/1904 | Niederlander . |
| 839,878 | 1/1907 | Niederlander . |
| 935,856 | 10/1909 | O'Meara . |
| 1,002,370 | 9/1911 | Curtis . |
| 1,070,838 | 8/1913 | Olson . |
| 1,181,565 * | 5/1916 | Block ............................. 251/293 |
| 1,267,545 * | 5/1918 | Haynie ............................ 251/292 |
| 1,311,889 * | 8/1919 | Hartdorn ......................... 251/293 |
| 1,355,544 * | 10/1920 | Drane et al. ..................... 251/293 |
| 1,393,882 | 10/1921 | Cornell . |
| 1,396,540 | 11/1921 | Stiglitz . |
| 1,437,156 * | 11/1922 | Schumacher .................... 251/293 |
| 1,827,861 * | 10/1931 | Volkhardt ........................ 251/292 |
| 2,527,801 * | 10/1950 | Downing .......................... 74/480 |
| 2,577,260 | 12/1951 | Moore . |
| 3,582,116 | 6/1971 | Young . |
| 3,598,361 * | 8/1971 | Crowe ............................. 251/144 |
| 3,776,373 * | 12/1973 | Mullen ........................... 206/16 R |
| 3,891,181 * | 6/1975 | Sanders .......................... 251/128 |
| 4,030,696 * | 6/1977 | Bake et al. ...................... 251/288 |
| 4,069,836 | 1/1978 | Sowinski . |
| 4,099,702 | 7/1978 | Temple . |
| 4,139,930 * | 2/1979 | Cox ................................. 145/29 R |
| 4,266,320 * | 5/1981 | Grant .............................. 16/114 R |
| 4,756,507 * | 7/1988 | McAndrew ....................... 251/292 |
| 4,770,388 * | 9/1988 | Carman ............................. 251/95 |
| 4,876,766 * | 10/1989 | Cohen ............................. 16/114 R |
| 5,213,308 * | 5/1993 | Jeromson et al. ................. 251/95 |
| 5,438,730 * | 8/1995 | Hansen, III ..................... 16/114 T |
| 5,478,142 | 12/1995 | LaLone et al. . |
| 5,482,251 | 1/1996 | Roberts . |
| 5,544,854 | 8/1996 | Carroll . |
| 5,609,324 * | 3/1997 | Pinkney .......................... 251/292 |
| 5,711,511 * | 1/1998 | Cynar .............................. 251/293 |
| 5,746,416 * | 5/1998 | Paylor ............................. 251/291 |
| 5,794,644 * | 8/1998 | Paylor ............................. 137/15 |
| 6,077,006 * | 6/2000 | Nelson ............................. 410/82 |
| 6,095,495 * | 8/2000 | Poteralski et al. ............... 251/293 |
| 6,102,368 * | 8/2000 | Poteralski et al. ............... 251/293 |
| 6,186,475 * | 2/2001 | Selepouchin .................... 2511/293 |
| 6,202,504 * | 3/2001 | Burkle ............................. 74/544 |

* cited by examiner

Primary Examiner—Robert J. Oberleitner
Assistant Examiner—Benjamin A. Pezzlo
(74) Attorney, Agent, or Firm—Barnes & Thornburg

(57) ABSTRACT

An extension handle for a manual valve connected at its first end to the stem of the valve by a pin which extends through the extension handle, the standard handle and the valve stem. A handle bracket may be mounted to the manual valve.

23 Claims, 3 Drawing Sheets

HANDLE EXTENSION OF A VALVE

BACKGROUND AND SUMMARY OF THE INVENTION

The present invention relates generally to brake control valves for the air brakes of a vehicle and more specifically to an improvement of access to a manual valve on pipe brackets.

In recent years, single sided pipe brackets have been introduced into the United States Rail Industry. The present design used is illustrated in FIGS. 1 and 2 and described in detail in U.S. Pat. No. 5,544,854. A pipe bracket 2 is mounted to a car body 4 by a pair of identical mounting brackets or pedestals 6 and 7. Fasteners 10 connect the mounting legs 8 of the pedestal to the car body. The pipe bracket 2 is mounted to the pedestal by bolts 12. A front face 14 of the pipe bracket 2 receives the control valve service portion 16 and the emergency portion 18 in a side-by-side relationship. The back face 20 of the pipe bracket receives the typical piping required to bring air to and to direct air from the respective control valve service and emergency portions. A cut-out cock or valve 22 is mounted to the back face of the pipe bracket 2. The cut-out valve 22 includes a ball valve rotatable through an angle of approximately 90 degrees to establish an open and close position of the cut out valve. The rotation is controlled by a lever or handle 24 which hangs vertically from its connection with the cut out valve in the open position and is disposed horizontally in the closed position.

Because the cut out valve 22 is mounted and displaced from the side of the pipe bracket 2, access to the handle 24 requires the operator to reach below the pipe bracket to operate the handle. To alleviate this problem or provide access from the front, a handle operating mechanism 26 is described specifically in U.S. Pat. No. 5,544,854.

The stem of the cut-out valve 22, extending exterior of the body and connected to the valve element, is not standard in that it is drilled and tapped to accept a cap screw to attach the L-shaped handle 24 to the stem. This makes the cut-out valve non-standard. In the event the cut-out valve becomes broken and needs replacing, it cannot be substituted and used with the handle operating mechanism 26 since the stem is not drilled and tapped. The U.S. Rail Industry demands commonality in their products to ensure that loaded freight cars are not stranded by non-common parts.

It should also be noted that the handle operating mechanism 26 when viewed from the front is an extended or non-extended position for its open and closed positions. This is different than the vertical when open and horizontal when closed standard for these valves. Thus, making it susceptible to visual misinterpretation of its position. It should also be noted that the handle operating mechanism 26 is located in a cramped position between the emergency portion vent, the bottom of the pipe bracket 2 and the pedestal 7 and mounting lugs 8. Further reference to the other detail this prior art device should be made to the U.S. Pat. No. 5,544,854.

Realizing that access to the handle of the dirt collector and cut-off valve was inconveniently located, another design of a single sided pipe bracket was developed and described U.S. Pat. No. 5,478,142. The cut-off valve was mounted on the back face adjacent to the side of the pipe bracket thereby allowing access to the operating handle of the cut-off valve adjacent the side of the pipe bracket. This particular design was not the design adopted by the industry. The design of FIGS. 1 and 2 was.

The present invention is to provide a conversion or extension kit to be used with standard valves using standard elements to provide access to a manual valve at the side of the pipe bracket. The valve mounted to the pipe bracket includes a stem connected to the valve element and a handle mounted on the stem. An extension handle or shaft is provided having a first end coupled to the stem and having a second end terminating in a handle portion. Preferably, the extension handle is L-shaped with one leg of the L-shape being the handle portion.

The extension handle is configured such that the second end extends past the side of the bracket. This provides access to the extension handle at the side of the pipe bracket. The extension is configured such that the handle and handle portion of the extension are co-planar. Thus, they assume the same open and closed positions mated to the stem.

The extension handle includes a bracket at the first end of the extension handle. The handle and the bracket are secured to the stem by a pin extending through the handle and the bracket. The handle includes a hub engaging the stem of the valve and the bracket engages the hub. The bracket may be U-shaped with an end wall across two legs of the U-shape and the first end of the extension handle is connected to the end wall of the bracket. Alternatively, the bracket may be U-shaped and the first end of the extension handle is connected to the bight of the bracket.

The extension handle may be provided as a kit to retrofit on existing dirt collector and cut-off valves or may be provided as part of a new brake control valves which has the standard dirt collector and cut-off valve mounted to a back face.

Although the extension has been designed for the dirt collector and cut-off valve or cock on the single sided pipe bracket, the invention of using an extension handle, which mates pre-existing stems of the manually operated valve with its handle and if needed a handle bracket, can be used on any valve on a railroad brake system.

Other objects, advantages and novel features of the present invention will become apparent from the following detailed description of the invention when considered in conjunction with the accompanying drawings.

DETAILED DESCRIPTION OF THE PREFERRED EMBODIMENTS

Figure 3:
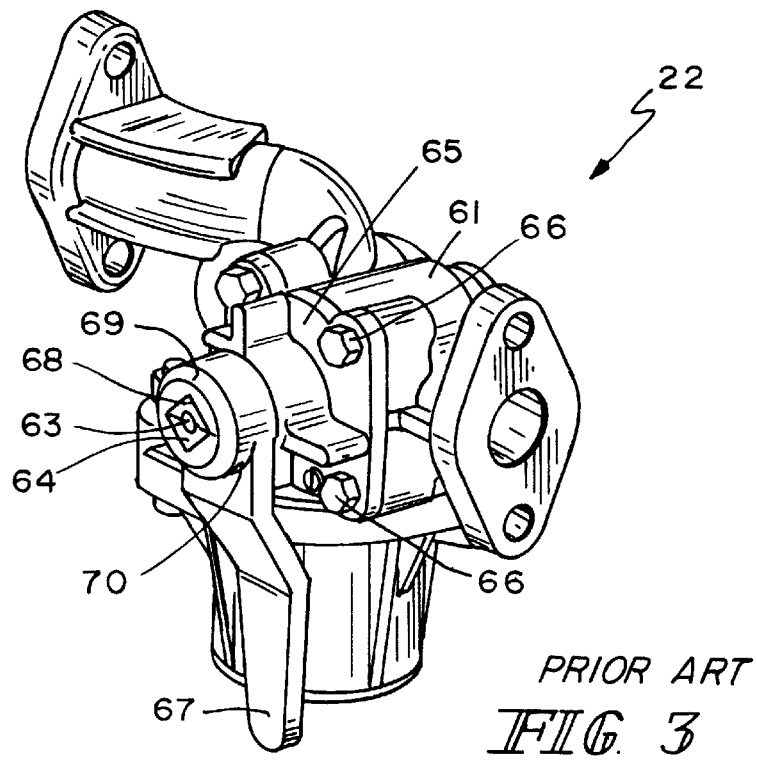
FIG. 3 is a perspective view of a cut-out cock of the prior art.

To better understand the standard dirt collector and cut-off valve 22, reference is made to FIG. 3. The cut-off valve 22 includes a body 61 and a valve element 62 (shown in FIG. 6) received in the body 61. A stem 63 is connected to the valve element 62 and includes a key 64. A cover 65 is secured to the body 61 by fastener 66. The standard handle 67 includes an opening 68 in a hub 69 which mates with the key 64. A pin 70 extends through the handle 67 and the key 64 to secure the handle 67 to the key 63, stem 65 and consequently valve element 62.

It should also be noted that although the present invention is described with reference to the cut-off valve, it may be used with other manual valve structures which are mounted to the pipe bracket or a part of a brake system wherein the handle is not readily assessable.

Figure 4:
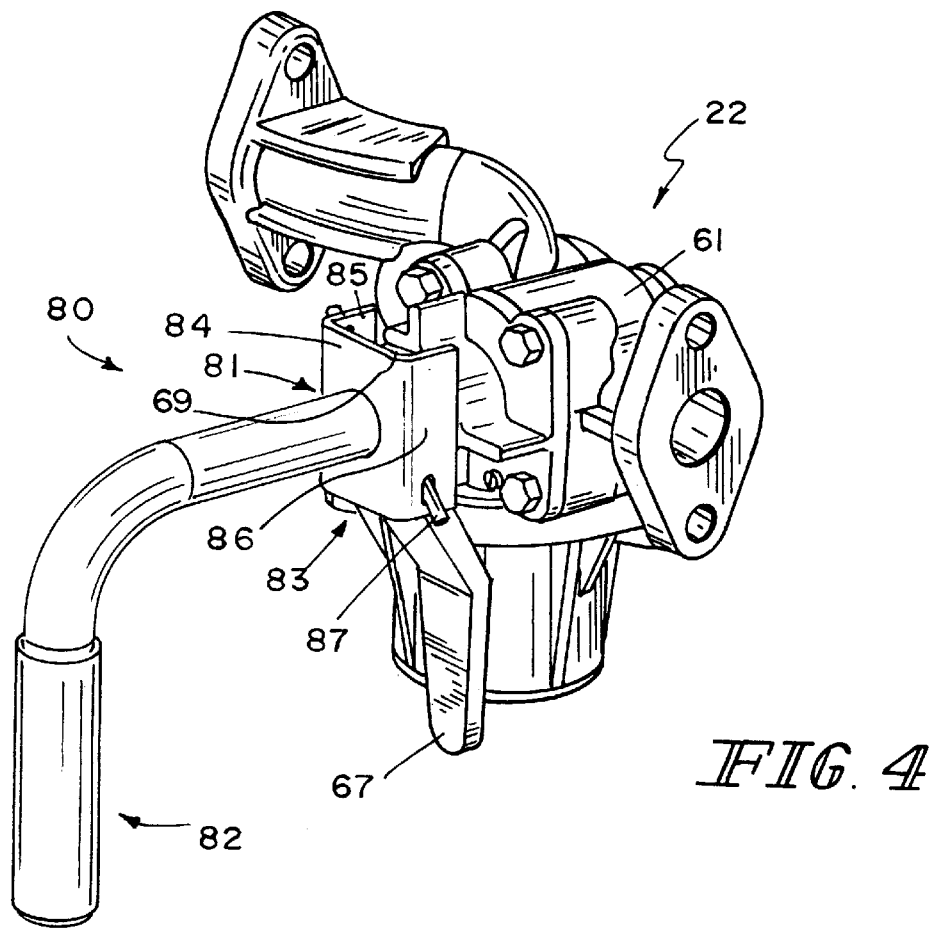
FIG. 4 is a perspective view of the first embodiment of the extension handle used with the cut-out cock of FIG. 3.
Figure 5:
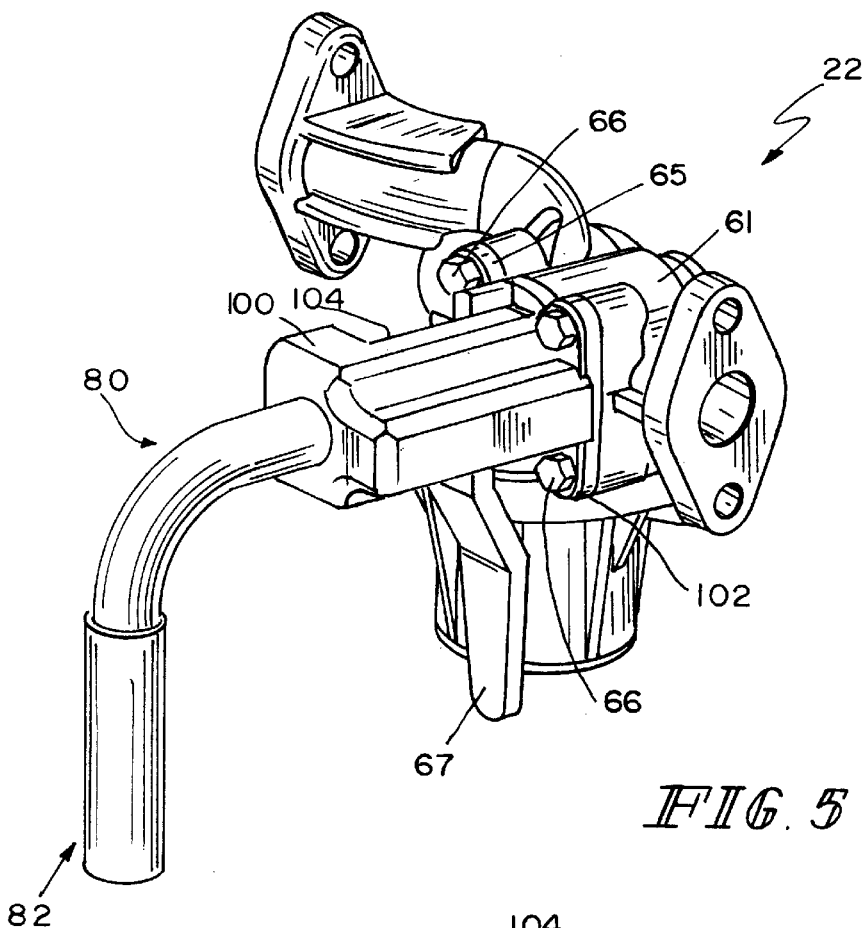
FIG. 5 is a perspective view of a second embodiment of an extension handle used with a cut-out cock of FIG. 3.
Figure 6:
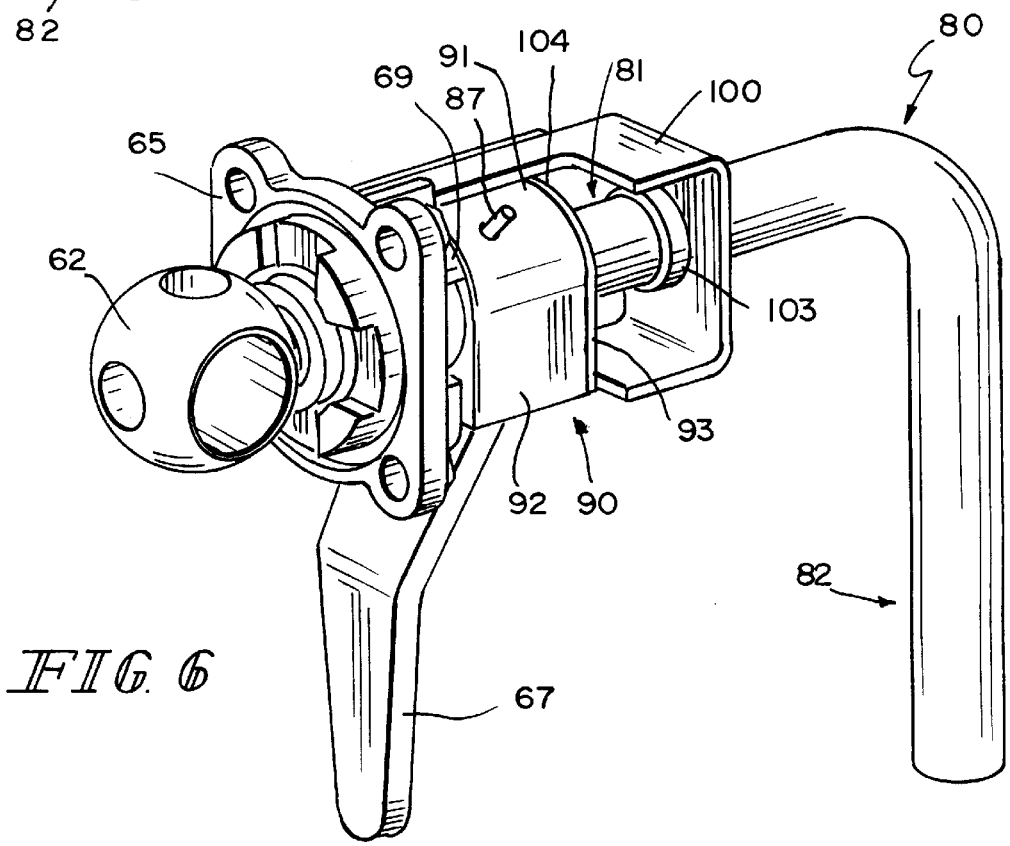
FIG. 6 is a different perspective of the embodiment of FIG. 5 with portions of the cut-out cock removed.

In FIGS. 4–6, the elements which are common to the prior art of FIG. 3 are used in FIGS. 4–6.

A first embodiment as illustrated in FIG. 4 shows an extension handle 80 secured at the first end 81 to the stem 63 and terminates at a second end in a handle portion 82. The first end 81 is connected to a U-shaped bracket 83 having a bight 84 and a pair of legs 85 and 86. The end 81 is secured to the bight 84. A pin 87 extends through the legs 85 and 86 of the bracket 83, the hub 69 of the handle 67 and the stem 63 or key 64. The pin 87 replaces the pin 70 of the regular handle and is substantially longer than pin 70. The legs 85 and 86 of the bracket 83 engaged the hub 69 of the standard handle 67. This firmly secures the extension handle 80 to the stem of the manual valve 22. A pin 87 extends through the legs 85 and 86 of the bracket 84, the hub 69 of the handle 67 and the stem 63 or key 64. The pin 87 replaces the pin 70 of the regular handle and is substantially longer than pin 70. The legs 85 and 86 of the bracket 83 engages the hub 69 of the standard handle 67. This firmly secures the extension handle 80 to the stem of the manual valve 22.

The method of installation includes removing the original pin 70 and positioning the extension handle 80 over the handle 67 and inserting the second pin 87 which is longer than the first pin 70 through the extension handle 80, the handle 67 and the stem 63.

FIGS. 5 and 6 show a second embodiment of the extension handle 80. Those portions which have the similar function as those in FIG. 4 have the same numbers. The first end 81 of the handle 80 is secured to a U-shaped bracket 90 which has a pair of legs 92 and a bight 91. An end wall 93 extends across the two legs 92 of the U-shaped bracket 90 and the first end 81 of extension handle 80 is secured at the end wall 93. The bracket 90 extends over and engages the hub 69 of the handle 67.

To stabilize the extension handle 80, a handle bracket 100 is provided. Flanges 102 of handle bracket 100 are positioned over the cover 65 and is secured to the body 61 by the same fastener 66 that secures the cover 65 to the body 61. A portion of handle 80 extends through a bearing 103 and is pivotally connected to the handle bracket 100.

Figure 1:
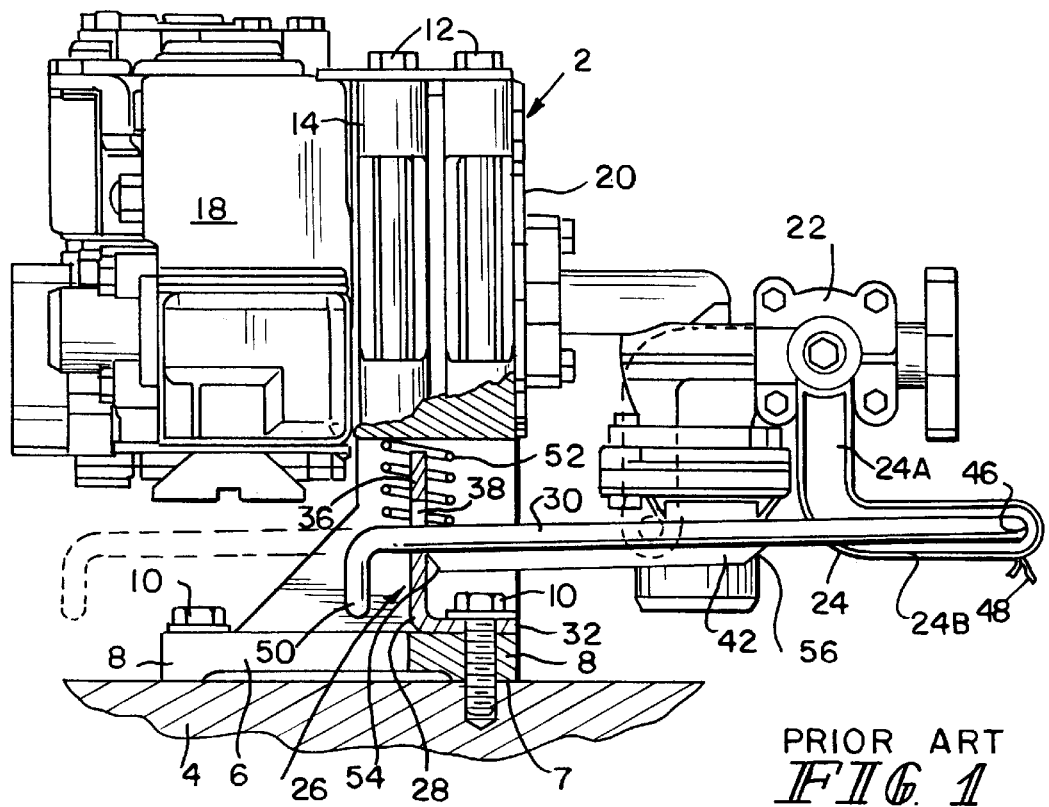
FIG. 1 is a side view of a single sided pipe bracket and control valve with the handle operating mechanism of the prior art.
Figure 2:
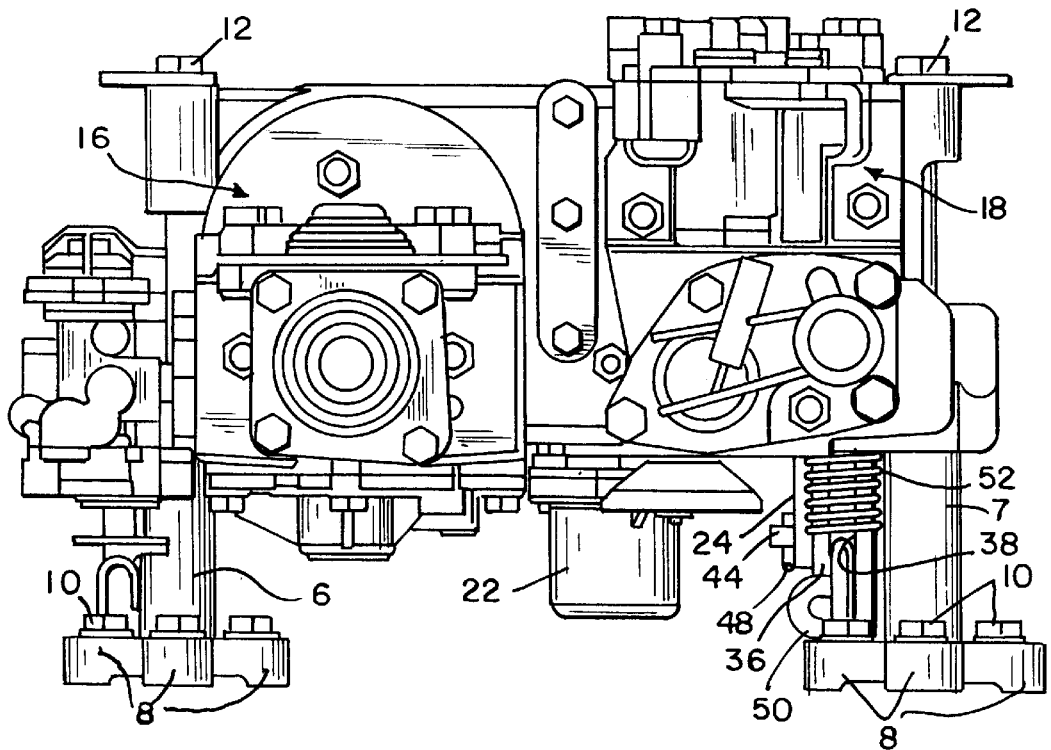
FIG. 2 is a front view of the prior art control valve of FIG. 1.

The extension handle 80 is illustrated with the handle portion 82 being coplanar with the handle 67. They also assume the same angular position with respect to the stem for the open and closed positions of the valve. The length of the extension handle 80 is sufficiently long to extend past the side of the pipe bracket to FIGS. 1 and 2. For example, the handle extends in the range of six inches from the standard handle 67.

As previously discussed, the present invention may be applied to retrofit existing valves or may be provided as a complete unit with a control valve. The use of the extension handle 80 may be used with other manual valves in railroad systems.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A brake control valve having a manual valve with a body and a cover secured to the body, and configured to be mounted on a face of a pipe bracket, the manual valve comprising:

a stem connected to a valve element;

a handle having a hub portion mounted on the stem;

an extension handle having a bracket portion adjacent a first end and coupled to the stem and the extension handle terminating in a handle portion at a second end;

and wherein the handle and the extension handle are secured to the stem by a common pin extending through the hub and the bracket portion.

2. A brake control valve according to claim 1, wherein the second end of the extension handle extends past a side of the pipe bracket.

3. A brake control valve according to claim 1, wherein the extension handle is L-shaped.

4. A brake control valve according to claim 3, wherein the handle and the handle portion are coplanar.

5. A brake control valve according to claim 1, wherein the handle and the handle portion assume the same angular positions with respect to the stem for open and closed positions.

6. A brake control valve according to claim 1, wherein hub engages the stem and the bracket engages the hub.

7. A brake control valve according to claim 1, wherein the bracket is U-shaped with an end wall across two legs of the U-shape and the first end of the extension shaft is connected to the end wall of the bracket.

8. A brake control valve according to claim 1, wherein the bracket is U-shaped having a bight and two legs and the first end of the extension shaft is connected to the bight of the bracket.

9. A brake control valve according to claim 1, including a handle bracket mounted to the manual valve and the extension shaft is pivotally mounted to the handle bracket.

10. A brake control valve according to claim 9, wherein the manual valve has a body and a cover secured to the body by fasteners, and the handle bracket is mounted to the manual valve by fasteners that connect the cover to the body.

11. A brake control valve having a manual valve mounted on a face of a pipe bracket, the manual valve comprising:

a stem connected to a valve element;

a handle on the stem;

an extension handle on the stem at a first end of and terminating at a second end; and a pin extending through and securing the handle and the extension handle to the stem.

12. A brake control valve according to claim 11, wherein the extension handle includes a bracket at the first end of the extension handle and the a pin extends through the bracket.

13. A brake control valve according to claim 12, wherein the handle includes a hub engaging the stem and the bracket engages the hub.

14. A brake control valve according to claim 12, wherein the bracket is U-shaped with an end wall across two legs of the U-shape and the first end of the extension handle is connected to the end wall of the bracket.

15. A brake control valve according to claim 12, wherein the bracket is U-shaped having a bight and two legs and the first end of the extension handle is connected to the bight of the bracket.

16. An extension kit for a manual valve to be mouted on a face of a pipe bracket of a brake control valve, the manual valve including a stem connected to a valve element and a handle secured to the stem by a first pin, the kit comprising:

an extension handle being configured to be positioned over the handle and the stem at a first end of the extension handle and terminating at a second end; and a second pin longer than the first pin for extending through and securing the handle and the extension handle to the stem.

17. A kit according to claim 16, wherein the extension handle includes a bracket at the first end of the extension handle and the a pin extends through the bracket.

18. A kit according to claim 17, wherein the handle includes a hub engaging the stem and the bracket engages the hub.

19. A kit according to claim 17, wherein the bracket is U-shaped with an end wall across two legs of the U-shape and the first end of the extension handle is connected to the end wall of the bracket.

20. A kit according to claim 17, wherein the bracket is U-shaped having a bight and two legs and the first end of the extension handle is connected to the bight of the bracket.

21. A brake control valve according to claim 20, including handle bracket to be mounted to the manual valve and the extension handle is to be pivotally mounted to the handle bracket.

22. A kit according to claim 21, wherein the manual valve has a body and a cover secured to the body by fasteners, and the handle bracket is to be mounted to the manual valve by the fasteners that connect the cover to the body.

23. A method of extending a handle on a manual valve to be mounted on a face of a pipe bracket of a brake control valve, the manual valve including a stem connected to a valve element and a handle secured to the stem by a first pin, the method comprising:

removing the first pin;

positioning an extension handle over the handle and the stem at a first end of the extension handle; and inserting a second pin longer than the first pin through the extension handle, the handle and the stem.

* * * * *